June 24, 1952 — D. R. BAILEY — 2,601,490
APPARATUS FOR SPLITTING ALMONDS
Filed June 1, 1948
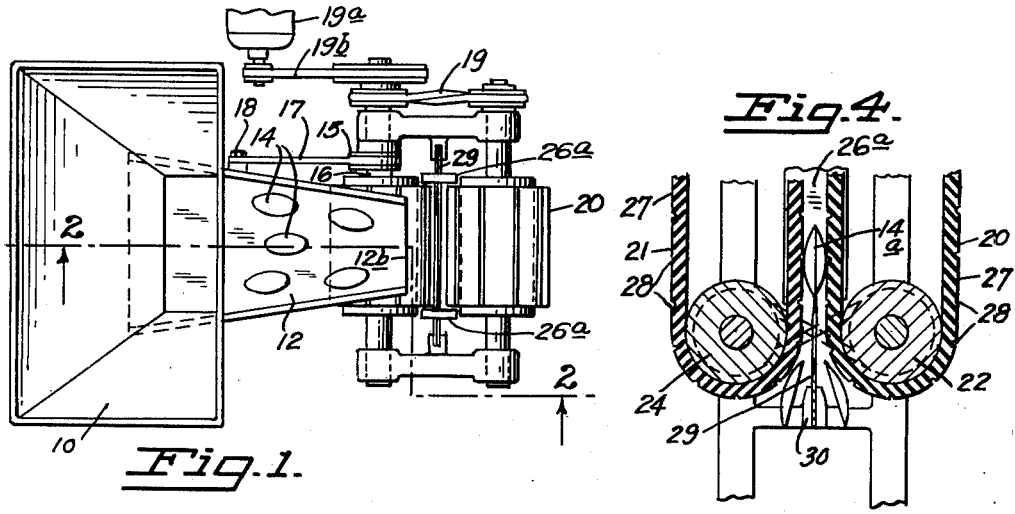
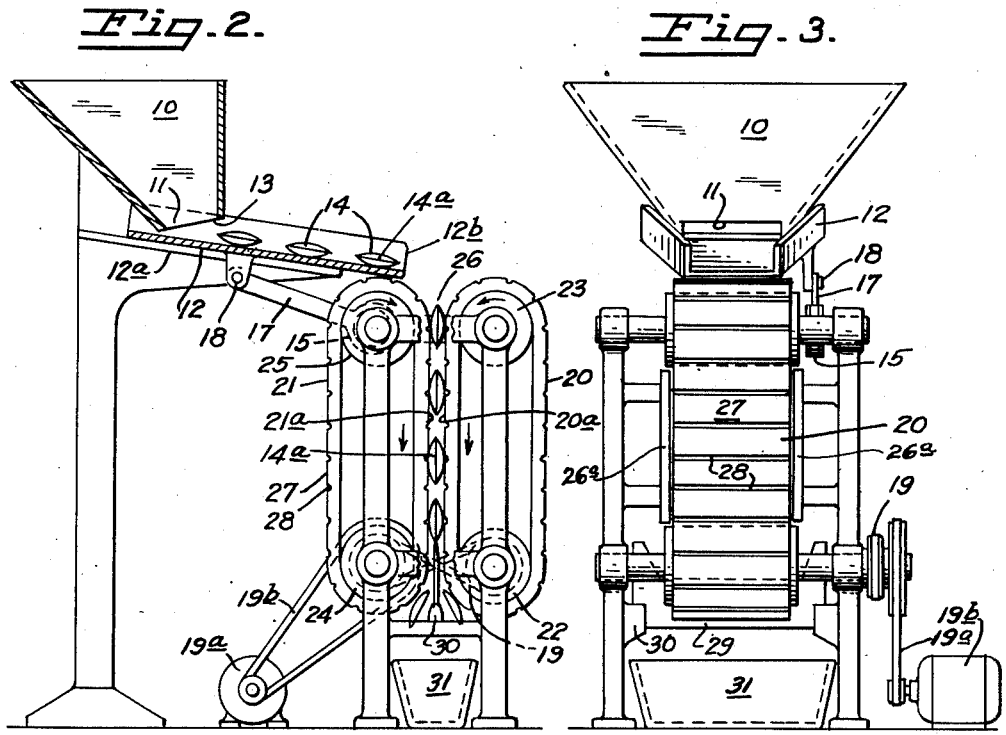
INVENTOR.
DAVID R. BAILEY
BY
ATTORNEY.

Patented June 24, 1952

2,601,490

UNITED STATES PATENT OFFICE 2,601,490

APPARATUS FOR SPLITTING ALMONDS

David R. Bailey, Sacramento, Calif.

Application June 1, 1948, Serial No. 30,278

1 Claim. (Cl. 146—72)

The present invention is for improvement in method and apparatus for splitting almond kernels, and more particularly relates to the splitting of the kernels substantially on the plane of their natural seam.

In a co-pending application filed simultaneously I have disclosed a method and apparatus for halving almonds longitudinally perpendicular to the seam.

As is well known, the almond kernel of commerce is the product of an almond nut which grows in a frangible shell surrounded by a husk. After harvesting, the surrounding husk is removed, after which the nut is dried, in which condition the shells are then removed to provide the dried almond kernel of commerce. These kernels when harvested are usually of a moist relatively soft pliable consistency, but when dried are crunchy, brittle and shatterable. Therefore it has been difficult without considerable chipping and shattering, to split the dried almonds on their seam which is a natural planar division of the almond into bisegmental planar parts which are held together in opposed face to face superficial contact at the seam.

Many advantageous uses and needs for almonds thus split are present in the bakery, confectionery and other arts. Consequently, it has become desirable that a portion of the annular crop of kernels shall be so split into planar segments substantially on the cleavage line of the seam, or closely parallel thereto, it being recognized that the splitting of the almond cannot always exactly coincide with the plane of the natural seam.

Since it is the almond kernels only which are processed by this invention, they are generally referred to merely as almonds.

Among the objects of the present invention are to provide a method and apparatus for splitting almonds into segments substantially on the natural planar seam or closely parallel thereto.

Another object is to provide a method for restoring pliability to almonds prior to splitting them on their planar seam, and removing the pliability after they are so split.

A still further object is to provide an apparatus adapted for delivering almonds to a cutter knife with the seam of the nut in substantially the same plane as the cutting edge of the knife.

With the foregoing and other objects in view, which will be apparent from or further set forth in this specification, one advantageous series of steps by which the method may be practiced and one form in which the apparatus of the invention may be embodied, are described herein, the apparatus being illustrated in the accompanying drawing, it being understood, however, that variations of details may be resorted to without departing from the spirit of the invention which is defined in the appended claim.

Since a portion of the steps of the method of the invention may be performed by the apparatus of the invention, the steps of the method will be more fully described in connection with the operation of the apparatus.

In the accompanying drawing:

Fig. 1 is a diagrammatic plan view of one form of apparatus by which the invention may be advantageously practiced.

Fig. 2 is a vertical longitudinal section on line 2—2 of Fig. 1.

Fig. 3 is a vertical end view of apparatus of Fig. 1.

Fig. 4 is a fragmentary enlarged view of a portion of apparatus in Fig. 1 in vertical cross section.

Referring to the drawing in which like reference characters indicate corresponding parts in the several views, 10 is a suitable feed hopper for receiving a batch of almonds, the hopper having a bottom opening 11 underlying which is one end of a transverse shaker plate 12, which is mounted for reciprocation on tracks 12a. The forward wall of the hopper terminates short of the shaker plate and thereby provides an elongated slotted opening 13 parallel with the plate and of a height of opening to permit passage therethrough from the hopper to the plate of the selected size of almonds 14 to be processed.

As is well known, the almond kernel is an elongated ovoidal body, relatively wide parallel to its seam 14a and relatively thin in a plane perpendicular thereto, its periphery narrowing in thickness at edges of the seam so that it would not normally be self-supporting upright on the peripheral edge of the seam. Therefore, the almonds as they are fed from the hopper upon the shaker plate always rest upon the planar side as shown in the drawing with the natural planar seam 14a parallel to the shaker plate.

The shaker plate is inclined downwardly from the hopper discharge feed opening 13 toward a belt assembly to be described. In order that the almonds may not slide uncontrolled and helter-skelter on the plate, the downward incline of the plate is less than the angle of free slippage. Therefore, the plate is agitated or vibrated by any suitable means to cause a gradual slippage of the almonds down the incline. The vibrating or shaking means as here exemplified comprises an eccentric hub 15 mounted for rotation at 16 and having a pitman rod 17 connected to the bottom of the shaker plate as at 18, whereby said plate is vibrated longitudinally, and thereby moves the almonds thereon down the incline of the plate.

The opposite or free end 12b of the shaker plate closely overlies, with reasonable sliding clearance, the upper end of a conveyor belt assembly which comprises a pair of relatively parallel continuous belts 20, 21, preferably vertically disposed. The pair of belts are of substantial length sufficient to firmly align almonds in transit, and of a transverse width at least substantially equal to and preferably somewhat wider than the overlying outlet 12b of the shaker plate. Each continuous belt is mounted at its opposite ends around a pair of relatively spaced rotatable rollers 22, 23, and 24, 25. The pair of rollers of each belt are preferably disposed relatively spaced vertically, and the respective pairs of rollers for the belts are relatively spaced horizontally with axes parallel so that the opposed conveyor faces of the belts are fixedly parallel for the grade or size of almonds being run through the apparatus. The horizontal spacing of the rollers of the respective belts is sufficient to provide a space 26 between opposed parallel faces of the belt lengths or flights substantially equal to, but preferably a trifle less than the average thickness of the body of the grade of selected almonds being processed, edge plates 26a preventing the almonds from working out of space 26. The drive of the rollers is so arranged that they rotate counterclockwise for one belt, say belt 20, and clockwise for the other belt 21, whereby the opposed and parallel belt faces 20a and 21a move in the same direction simultaneously. Such a drive may be accomplished in any well-known way, and is herein conventionally shown as a twisted belt drive 19 operative to rotate one roller of each pair of belt-supporting rollers.

The belts are preferably of naturally resilient and non-slip material, such as rubber composition reinforced by textile fabric, so as to better grip the almonds engaged between the opposed faces thereof; and for this same purpose may, if desired, have roughened faces or transverse strips 27 between grooves 28, for further pressure engagement of the almond in transit by the belt. The belt rollers 22 to 25, inclusive, may also be of a soft and spongy material to permit passage thereby, without breakage, of almonds carried by pressure engagement between the opposed faces of the resilient belts.

Adjacent the discharge end of the belts, there is mounted transversely centrally in the space between the opposed faces of the belt a knife 29, the cutting edge 29a of which is parallel with and substantially at the same elevation as the axes of the rollers, and extends entirely across the belt faces, the cutting edge being substantially perpendicular to the length of the belts. The knife is substantially equally spaced from each adjacent belt face and in a plane substantially parallel thereto, said cutting edge being substantially at or closely adjacent the plane through the axes of the rollers as shown in Fig. 3, since it is at said position that the relatively opposed most nearly adjacent portions of the belts on rollers 22 and 24 begin to increase the relative spacing of the belt faces as they pass around the diverging circumferences of the rollers at the discharge end of the belts. The knife is supported transversely of the belt by brackets 30. The purpose of having the cutting edge of the knife preferably so positioned at the discharge end of the belts is that if the almonds were to be cut by the knife while they were engaged centrally of the length of the belt, the resilient pressure of the opposed belt faces would make the almonds frictionally press against the knife blade, tending to break the cut segments, and possibly cause them to pile up or congest at the knife, whereas, with the cutting edge of the knife positioned as stated, the almonds, though still engaged and propelled by the parallel opposed faces of the belts, are cut when they reach or are just passing the axes of the rollers, which is also the maximum opposed diameter of the rollers, at which point the belts begin to spread further apart, as they diverge around the rollers, so that the pressure on the side faces of the almonds ceases as the almonds are cut, and there is a space of progressively increasing width between the knife and belt faces as the belts pass around the rollers, so that the cut segments of the almonds are freely discharged from the belt on both sides of the knife.

Any suitable drive means may be employed to rotatively drive the belts 20 and 21 and merely by way of example a motor 19a is illustrated driving belt 19b, which in turn drives the twisted belt 19 of one of the rollers propelling each belt, the belts 20, 21 serving to drive their respective upper rollers and the eccentric 15 of the shaker plate.

In operation of the apparatus and practice of the method, the almond kernels are first graded for size and quality. Since the almonds will have previously been dried, they are brittle and crunchy and would be liable to break and chip in the splitting process. Therefore the almonds are first moistened to restore their pliability and make them non-shatterable.

The moistening or restoration of pliability of the almonds may be accomplished in several ways, three of which are set forth.

One satisfactory method of moistening the dried almonds to restore pliability is by immersing them in cold water for a short period of time, for example about five seconds, merely to thoroughly wet the exterior; and then permit them to stand, preferably in the same container, for approximately 12 hours so that the moisture may slowly and completely penetrate the almond body and thus restore its pliability throughout the body by absorption. This method of restoring the pliability permits large quantities of almonds to be so treated in batches of 100 pounds or even larger quantities enclosed in porous sacks or perforated bins. Preferably the almonds are moistened the evening of one day for operation through the apparatus the following morning.

A second and quicker method of restoring pliability is to expose the almonds to wet steam in a closed container for approximately 10 minutes, the pressure of the steam serving to force moisture through a batch of almonds and to permeate through the body of the individual almond. This second method involves a greater expense of handling, but is quicker because the almonds may be passed through the apparatus for splitting immediately thereafter.

A third method of restoring the pliability of the kernels takes into account the latent moisture and oil in the dried almonds. It has been found by experience that the pliability may also be restored by heating the dried almonds in a non-aerated container; that is, without exhausting the air therein which is moistened by the heated almonds. Preferably a rotating drum is employed in which the temperature of the almonds is raised to substantially 200 degrees F. for approximately 20 minutes, after which they may be immediately split on their natural seam while still retaining the heat.

The almonds, with pliability restored, are then dumped in mass into the feed hopper and fed responsive to gravity through the feed opening 11 and slot 13 to the downward inclined vibrated shaker plate 12. Since the almonds will not normally stand on the peripheral edge, they are arranged on the planar side responsive to gravity, and if originally resting one upon another, they will be levelled out by vibration of the shaker plate. The vibration of the plate moves the almonds down the inclined plate, to its discharge end 12b which overlies the arcuate portion of one belt where the belt loops around one of the upper rollers. The almonds are thus deposited on one of the moving belt faces at the upper end of the space 26 between the opposed parallel belt faces, with the natural planar seam parallel to the belt face, and thereupon drop by gravity into the space 26, and are thus engaged by resilient pressure between the opposed relatively parallel moving belt faces 20a and 21a. The transverse strips 27 and grooves 28 facilitate the non-slip engagement of the almonds during transit by the belt. The belt faces carry the almonds thus held between them, to the cutting edge of the knife 29 which is spaced centrally and substantially parallel relative to each of the belts; and since the seam of the almond is also approximately centrally spaced in the almond body and therefore substantially centrally spaced between the opposed faces of the belts, the knife slices the almond substantially along its seam, and the two segments of the almond drop into a bin 31 for further treatment.

Following the splitting process, the split almond kernels to which moisture has been added by either the first or second method of restoring pliability, are exposed to artificial heat, for example, on trays for a period of from 60 to 75 minutes at a temperature of 130 to 140 degrees F., or on conveyors from 15 to 20 minutes at 200 degrees F. which may include using infra-red lamps, the stated times and temperatures being approximate by way of example. This treatment is to evaporate moisture added to the almond kernels as above described, removing the induced pliability and thus restore the crunchy brittle characteristics.

Where the third method of restoring pliability is employed, that is, the subjecting of the whole dried almond kernels to heat, it is not necessary to again subject them to heat for drying after splitting, but rather it is only necessary to permit the split segments to cool to normal temperature which removes the induced pliability and restores the original crunchy, brittle characteristics.

The dried split almond segments are then passed over perforated screens to remove the small fragments and any imperfectly split kernels, slivers and broken pieces, after which the finished product is packed in suitable containers.

If the almonds are to be of the blanched type, additional initial steps are taken with the whole almonds prior to passing the almonds through the apparatus for splitting them. In order to remove the skin or pellicle from the almonds, they are soaked in hot water to loosen the skin from the enclosed nut meat, and the skin or pellicle may then be easily removed mechanically by passing between corrugated resilient rollers, or manually by squeezing the kernel between the fingers, both ways being heretofore known. After removal of the skin, the almond kernels are allowed to stand for a substantial time, two hours being sufficient by way of example, in order to permit the moisture to penetrate the center of the nut meat. This subjecting of the skinless almonds to moisture may soften the exterior portion of the nut meat more than desired, so that it is desirable to expose the skinless nut meat to artificial heat for restoration of a firm consistent body to feed into the splitting apparatus, though it is not thoroughly dried, since it is desired to maintain its pliability similarly to other types of almonds when being passed through the apparatus.

With the induced pliability retained, the skinless nut meat may then be fed to and conveyed through the apparatus in the same manner as hereinbefore described for splitting and for further treatment. The final drying time for the blanched almonds may be extended for a longer period than those retaining the skin, because, as a general rule, it is desired that the split blanched almonds be restored to a greater degree of brittleness than the almonds which have the pellicle retained.

Having described the invention, I claim:

A device of the character described comprising a pair of relatively spaced longitudinally movable resilient conveyor belts having fixed parallel substantially planar opposed faces, means at one end of the belts for feeding almonds, a vibrated shaker plate interposed between the feed means and belts and adapted for receiving almonds from the feed means, means for vibrating the shaker plate whereby almonds are fed at one end portion of the belts adjacent one end of the space between the belts, a fixedly mounted cutting knife adjacent the opposite discharge end of the belts and having its cutting edge in a plane centrally spaced between and substantially parallel to the belt faces, and rotated rollers at the opposite ends of each belt, the rollers of one belt being rotatable clockwise and the rollers of the other belt being rotatable counterclockwise whereby the opposed belt faces move simultaneously in the same direction, said knife having its cutting edge transversely perpendicular relative to the length of the belts and extending across the entire face of the belts substantially at the plane through the axes of the adjacent rollers at the discharge end of the belts, whereby said cutting edge is positioned closely adjacent the most nearly opposed diameters of said rollers and a space of progressively increasing width is provided on each side of the knife for discharge of the split sections of almonds between each side of the knife and the adjacent divergent face portions of the belt moving around the circumference of the rollers.

DAVID R. BAILEY.

REFERENCES CITED

The following references are of record in the file of this patent:

UNITED STATES PATENTS

| Number | Name | Date |
| --- | --- | --- |
| 1,064,531 | Ott | June 10, 1913 |
| 1,126,991 | Hahn | Feb. 2, 1915 |
| 1,307,367 | Logan | June 24, 1919 |
| 1,664,334 | Thompson et al. | Mar. 27, 1928 |
| 1,985,235 | Bizzell et al. | Dec. 25, 1934 |
| 1,988,901 | Hoefling | Jan. 22, 1935 |
| 2,075,159 | Andreasen | Mar. 30, 1937 |
| 2,344,711 | McNutt | Mar. 21, 1944 |